UNITED STATES PATENT OFFICE.

FRANKLIN R. CARPENTER, OF DENVER, COLORADO, ASSIGNOR TO THE AMERICAN IRON AND STEEL ALLOYS COMPANY, OF DENVER, COLORADO, A CORPORATION OF COLORADO.

PROCESS OF RENDERING POTASH COMPOUNDS SOLUBLE.

959,841.  Specification of Letters Patent.  Patented May 31, 1910.

No Drawing. Application filed December 31, 1906. Serial No. 350,099.

*To all whom it may concern:*

Be it known that I, FRANKLIN R. CARPENTER, a citizen of the United States, residing in the city of Denver, in the county of Denver and State of Colorado, have invented a new and useful Process of Rendering Potash Compounds Soluble, of which the following is a specification.

The needs of agriculture call for a constantly increasing supply of potash and potassium compounds to replenish the waste incident to cultivation of the soil. The present supply is largely controlled by a foreign syndicate, and the cost is constantly advancing. It has been found, however, that certain granites and other rocks, especially those containing feldspars and micas, carry potash in a form that may be made available by fine grinding; but such rocks even after fine grinding are in their natural state almost, if not entirely, insoluble in ordinary acids, and, hence not at once available for plant life and at best only become available after greater or less periods of time after exposure to the action of the soil. Granite, from which the supply of potash must mainly come, is also difficult to pulverize, but it is mainly to improve the solubility of its potash minerals for the purposes of plant life that my discovery proposes, and not especially to make them more easily pulverized. This ease of solubility I accomplish by first heating crushed granite or other rocks in which potash minerals occur to a high heat, even to the fritting or fusing of the same either with or without flux, and then suddenly cooling the same in water, which brings about such a change in their composition or molecular construction that the formerly insoluble potash minerals become readily soluble in certain acids, notably hydrochloric acid, hence directly available for plant life. After this heating, fritting or fusing and subsequent chilling, the material is ground to a fine powder and used as a fertilizer for soils in the manner of any other fertilizer.

It is well-known that potash compounds contained in granites and other rocks, especially those containing feldspar, are insoluble, being in a crystalline condition. By my process, by first subjecting the rocks containing said compounds to a high heat and then suddenly chilling them the compounds are changed from a crystalline to an amorphous form and are prevented from passing back to a crystalline form and in this condition they are soluble and available for plant life.

In my process the heating step has the effect of loosening the molecular structure of the material and the sudden cooling or chilling causes the material to be held in this loosened condition. Furthermore, the chilling or the sudden cooling causes the material to become vitreous and to retain the heat of crystallization which would be set free if the material were cooled slowly and would thereby become crystalline. This occluded heat of crystallization renders the material easily decomposable in the manner before described.

Having thus clearly described my discovery, what I claim as my invention is—

1. The process of preparing rocks containing potash compounds for use in agriculture which consists in intensely heating the same and then suddenly cooling the heated material to change its molecular structure and render the compounds soluble and available for plant life and then finely grinding the same for use.

2. The process of preparing rocks containing potash compounds to render them soluble which consists in intensely heating the same with a flux and then suddenly cooling them to change the compounds from a crystalline to an amorphous condition and then finely grinding the material for use.

3. The process of treating feldspathic rocks which consists in heating them and then suddenly chilling them to change them from a crystalline to an amorphous state whereby they are rendered soluble and then reducing the material to a fine powder.

4. The process of treating feldspathic rocks, which consists in intensely heating them to loosen the bonds of the molecular structure and then suddenly chilling the material to hold the molecular structure in this condition and to render the material soluble and then reducing the material to a fine powder.

5. The process of treating feldspathic rocks, which consists in intensely heating them, and then suddenly chilling the fused material to cause it to retain the heat of crystallization and to thereby render it soluble and then reducing the material to a fine powder.

In testimony whereof, I have hereunto subscribed my name.

FRANKLIN R. CARPENTER.

Witnesses:
A. R. MORRISON,
E. D. DE SOTO.